United States Patent

Delaney, III et al.

[11] Patent Number: 5,349,896
[45] Date of Patent: Sep. 27, 1994

[54] PUMP DIAPHRAGM

[75] Inventors: William E. Delaney, III, Hockessin, Del.; John M. Connelly, Jr., Rising Sun, Md.; Fred C. Sicker, Newark, Del.

[73] Assignee: W. L. Gore & Associates, Inc., Newark, Del.

[21] Appl. No.: 76,605

[22] Filed: Jun. 14, 1993

[51] Int. Cl.$^5$ .............................. F01B 19/00
[52] U.S. Cl. .................. 92/98 R; 92/103 R; 92/103 F; 92/103 SD
[58] Field of Search ............ 92/96, 97, 98 R, 99, 92/100, 101, 102, 103 R, 103 R, 103 F, 103 SP, 104, 105, 47

[56] References Cited

U.S. PATENT DOCUMENTS

| | | | |
|---|---|---|---|
| 2,632,475 | 3/1953 | Elo | 92/104 |
| 2,840,339 | 6/1958 | Price | 92/103 F |
| 2,913,008 | 11/1959 | Cordero | 92/104 |
| 3,209,200 | 10/1965 | Waldherr | 92/100 |
| 4,238,992 | 12/1980 | Tuck, Jr. | |
| 4,270,441 | 6/1981 | Tuck, Jr. | |
| 4,375,182 | 3/1983 | Zavoda | 92/102 |
| 4,885,983 | 12/1989 | Zavoda | 92/104 |
| 5,145,336 | 9/1992 | Becker et al. | 92/99 |
| 5,217,797 | 6/1983 | Knox et al. | |

FOREIGN PATENT DOCUMENTS

| | | | |
|---|---|---|---|
| WO9200343 | 6/1991 | PCT Int'l Appl. | |
| 1246604 | 9/1971 | United Kingdom | 92/99 |

Primary Examiner—Thomas E. Denion
Attorney, Agent, or Firm—Gary A. Samuels

[57] ABSTRACT

A flexible pump diaphragm for pumping fluids is described in which the diaphragm has a number of ribs or troughs located radially across its circumferential flexure portion.

1 Claim, 3 Drawing Sheets

PUMP DIAPHRAGM

FIELD OF THE INVENTION

This invention relates to diaphragms for pressure driven pumps.

BACKGROUND OF THE INVENTION

Diaphragm pumps are widely used in pumping a wide variety of materials especially when the materials are abrasive, have high viscosity, or consist of slurries that might damage other pump designs. These pumps are often air driven which is advantageous in pumping flammable liquids or in environments where electrically driven equipment could otherwise be hazardous. However, electrically or otherwise mechanically driven designs also find wide utility. Due to the wide nature of different materials these pumps are used to move, a correspondingly wide variety of materials are used in their construction. These include plastics and metals. For the same reason the critical driving member, i.e., the pump diaphragm must be manufactured in a variety of materials.

Chemically resistant layers, such as those made of polytetrafluoroethylene (PTFE), are widely used in industry to protect sensitive parts of machinery or equipment from the corrosive effects of acids or other chemicals. One such use is in one or two piece pump diaphragms commonly used with air or electrically driven diaphragm pumps. In the two piece diaphragms, an outer PTFE overlay diaphragm is commonly used to protect an inner rubber diaphragm from materials that would cause rapid failure of the rubber part alone. In some other cases, the PTFE provides the sole material of construction of the diaphragm.

In all cases the repetitive flexing of the diaphragm eventually causes failure of the PTFE diaphragm or the rubber diaphragm. Since PTFE fatigues more readily than commonly used rubbers such as Neoprene, in those cases where a two piece diaphragm is used the PTFE diaphragm usually fails first. When the diaphragm fails, it often fails forming a radial crack.

It is therefore advantageous to design the diaphragm part in such a way as to minimize the stress on the part that normally results from its operation. In one attempt to minimize stress, Tuck U.S. Pat. No. 4,238,992 teaches that a PTFE diaphragm can be designed to have a series of concentric ribs spaced uniformly across the pressure receiving side. This design appears to reduce stress. It would be desirable however to design pump diaphragms that reduce stress by other means.

SUMMARY OF THE INVENTION

Surprisingly, it has now been discovered that although flexible diaphragms normally fail due to radial cracking, the flex life can be substantially increased by shaping the part to have a number of radial ribs or troughs running across a generally annular flexure portion of the diaphragm, i.e., from near the center to near the outer perimeter. Although these might have been thought to act as a loci for failure, and although the design is contrary to the teaching of the Tuck patent mentioned above, diaphragms formed with the radial ribs or troughs have much less tendency to form radial cracks in use and therefore have a longer lifetime in use.

Thus, in a flexible pump diaphragm having a central opening for receiving a piston rod, and having a generally annular flexure portion capable of forming a concave configuration on the pressure receiving side, the invention can be described as the improvement comprising a plurality of radially disposed means on at least one surface of the diaphragm for relieving flexural stress on the diaphragm in which the means are disposed over the annular flexure portion.

In one embodiment, the means comprises a plurality of generally uniformly spaced ribs extending radially outwardly across at least a portion of the annular flexure portion. The ribs can be on either the concave or convex side, or both.

In another embodiment, instead of ribs, the radially disposed means can comprise a plurality of generally uniformly spaced troughs extending outwardly radially across at least a portion of the annular flexure portion.

In still another embodiment, the diaphragm has a series of concentric ribs on the concave air pressure side, and the radially disposed means is defined by discontinuities in the concentric ribs in which the discontinuities are in the form of a break in the ribs which are aligned radially from rib to rib.

DESCRIPTION OF THE INVENTION

Figure 1:
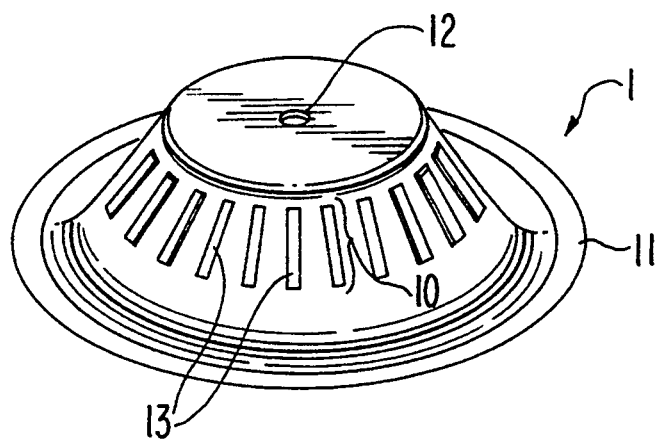
FIG. 1 shows a three-dimensional perspective view a flexible pump diaphragm of the invention looking at the convex face side.
Figure 2:
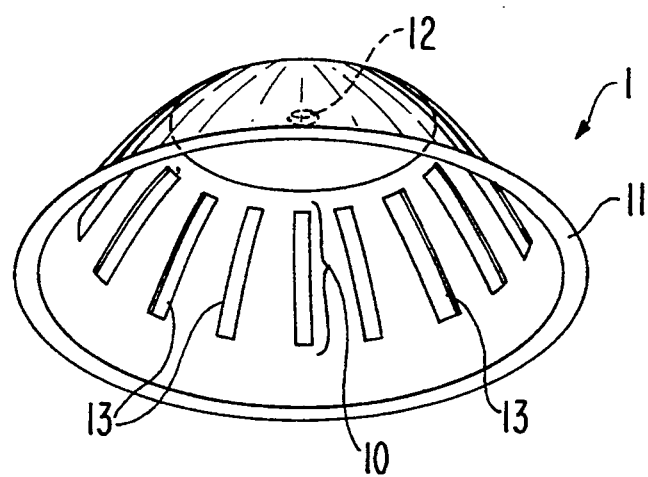
FIG. 2 shows another three-dimensional perspective view of a diaphragm looking up into the concave pressure receiving side.

FIG. 1 depicts a diaphragm 1 of the invention having a generally flexure portion 10, lip 11, central hole 12, and radially disposed ribs 13 on the outer convex area of flexural portion 10. As shown in FIG. 2, the ribs can be on the convex side, or on both sides.

Figure 3A:
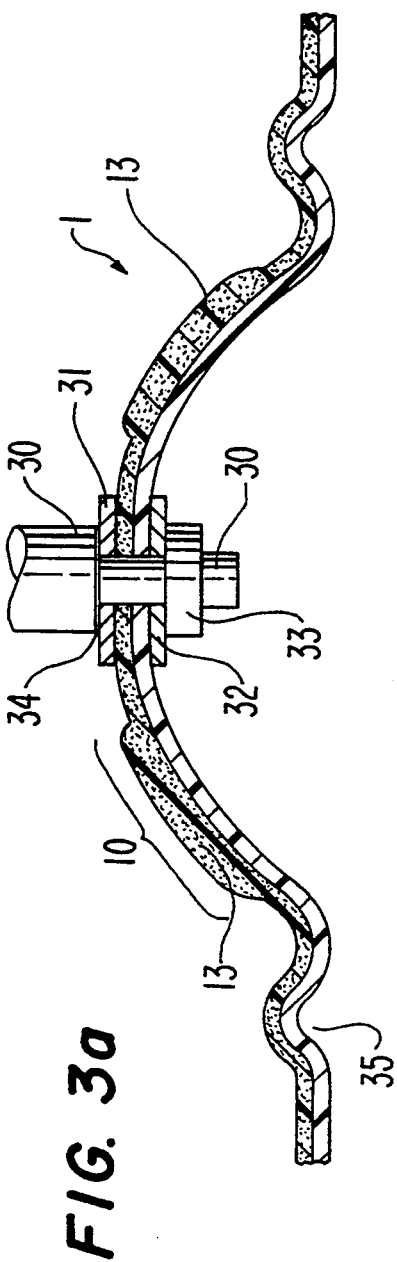
FIG. 3 is a cross-sectional view of the diaphragm of FIG. 1 shown in operation both at rest and in flex position.
Figure 3B:
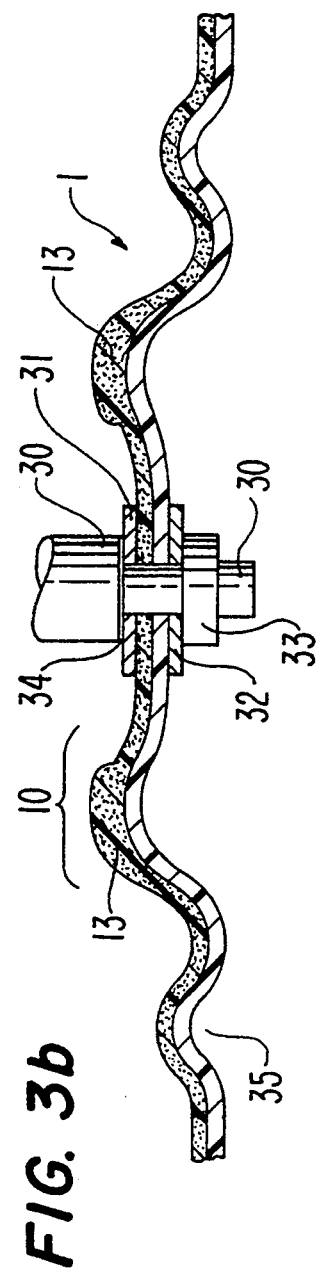

Referring to a typical pump diaphragm in operation, reference is made to FIG. 3 in which the pump diaphragm 1 is shown in cross-section from the side in both at rest and in flexed position. The pump has pistons 31 and 32 on either side of diaphragm 1, and has piston rod 30 through central hole 12 in the diaphragm. The piston rod is equipped to hold the pistons in place by nut 33 and by flange 34 on rod 30.

Figure 4:
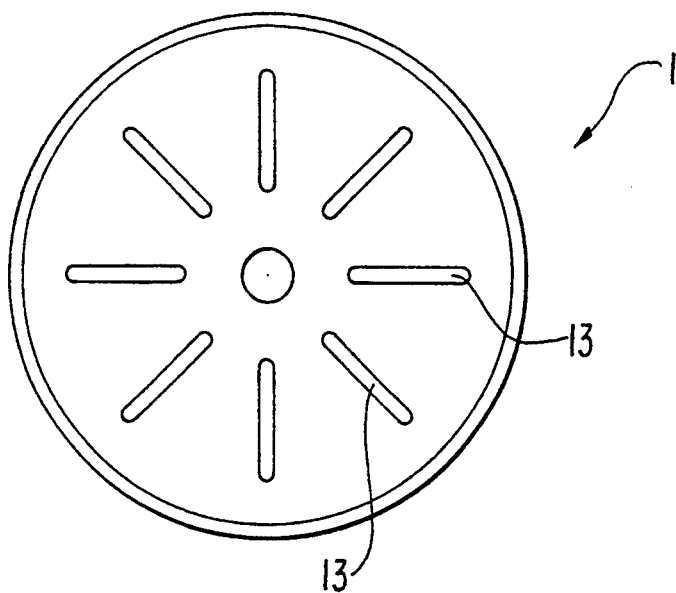
FIG. 4 is a view from the top of a diaphragm of the invention showing the radial configuration of the ribs.

The flexure portion 10 in FIG. 3 has ribs 13 on the convex side of the flexure portion. The diaphragm is configured to affix at its outer circumference to an appropriate housing (not shown) through bead 35. The flexure portion is generally annular in configuration and provides a concave area on the air pressure side of the diaphragm. As shown in FIG. 4, which is a view of the top of diaphragm 1, looking down on the convex side, ribs 13 are shown extending radially across the flexure portion. The ribs are preferably spaced substantially uniformly across the flexure portion.

The ribs are substantially uniform in height and where they join the face of the diaphragm are usually rounded to reduce stress points.

Instead of ribs the radially disposed configuration can take the forms of depressions or troughs in the faces of the diaphragm.

Figure 5:
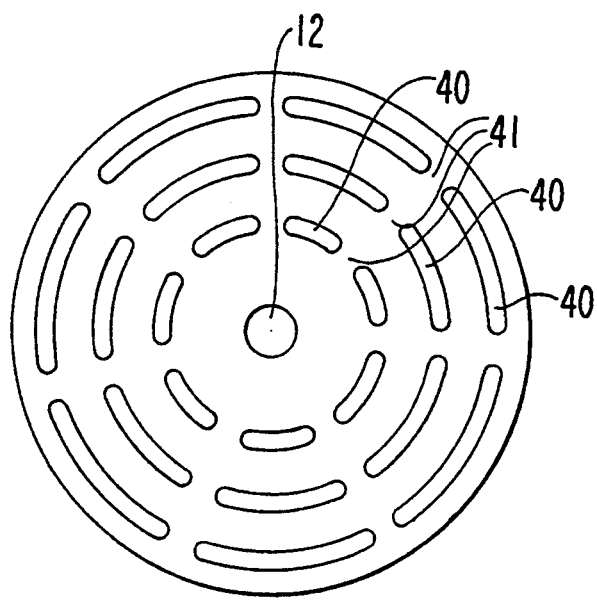
FIG. 5 is another embodiment of the invention.

In addition the diaphragm may contain concentric annular rings or ribs across the annular flexure portion as shown in FIG. 5, which depicts a view looking up into the convex portion of a diaphragm in which annular disposed ribs 40 are arranged concentrically around opening 12 and in series across the flexure portion of the diaphragm. In this variation, the radially disposed means comprises openings 41 cut through the concentric ribs in a radial fashion as shown in FIG. 5. The openings can be described as aligned discontinuities in the ribs in which the discontinuities are aligned radially from rib to rib.

While the invention is applicable to any flexible diaphragm, it is particularly applicable to diaphragms which are composites of a face layer of polytetrafluoroethylene (PTFE) and an air pressure side layer of a resilient elastomeric material.

The PTFE layer is preferably a layer of dense PTFE, either full density PTFE or densified stretched PTFE. An example of full density PTFE is skived PTFE. Densified PTFE can be made by compressing porous PTFE. The PTFE material provides the composite diaphragm with an inert outside surface thereby increasing the durability and chemical resistance of the diaphragm. The solid PTFE layer has an inside surface which is adhered to the resilient elastomeric material. Optionally, this inside surface may be treated, e.g., with alkali naphthanates, to increase the surface energy of the PFTE and thereby increase its adherence to the reinforced flexible composite material.

The flexible elastomeric layer can be a thermosetting elastomer, thermoplastic elastomer, or a thermoplastic polymer having a flexural elastic modular (ASTM D790-84A) of less than 1,400 MPa.

The thermosetting elastomer can be a fluoroelastomer including those containing hydrogen and those not containing hydrogen, perfluoroelastomer, and fluoroelastomer containing silicone moieties, nitrile elastomer, acrylic elastomer, olefin diene elastomer, chlorosulfonated polyethylene elastomer, polychloroprene elastomer, butyl and halogenated butyl elastomer, styrene-butadiene elastomer, polydiene elastomer or silicone elastomer.

The thermoplastic elastomer can be a copolyetherester elastomer, polyurethane elastomer, styrene polyolefin block copolymer elastomer, polyamide elastomer, or ethylene copolymer elastomer.

The thermoplastic having a flexural elastic modulus (ASTM D790-84A) less than 1,400 MPa, can be selected from fluorinated thermoplastics such as copolymers of tetrafluoroethylene, copolymers of vinylidine fluoride, copolymers of chlorotrifluoroethylene, polyolefins, or plasticized polyvinyl chlorides.

The PTFE layer is adhered to the resilient elastomeric layer through any known means, for example, by application of a sufficient amount of heat and pressure. The diaphragm with the ribs are made by placing the PTFE/elastomeric composite into a mold of desired shape and applying heat and pressure.

This invention provides a way to significantly increase the life of flexible diaphragms. This novel design utilizes radial ribs spaced uniformly across the flexing portion of the diaphragm. The purpose of the ribs is to direct the flexing action uniformly to the juncture between each rib and the space between the ribs. Each juncture can be thought of as a small hinge. In a diaphragm that is designed without the radial ribs or without some other method to uniformly direct the folding forces that take place in flexing a diaphragm, deformations occur early in the use of the diaphragm. In most cases these forces result in a small number of permanent deformations on the face of the part usually between two and nine in number. Once these deformations occur, the rest of the life of the diaphragm is characterized by a deepening of these (radial) deformations as they begin to act as hinges for folding and unfolding the part on each flex cycle. On thick commercial parts, the deformations may not be easily seen but they are measurable and can be seen by watching the diaphragm flex under strobed light. Failure occurs when the deformations deepen to the point where material has physically migrated from the deformed area and the part can no longer endure the stresses resulting from each flex. At that point a large crack propagates radially along one of the original deformations completely breaking through the diaphragm.

The design of this invention surprisingly provides the diaphragm with such a high number of loci for eventual failure that it results in a spreading of the forces over so many "hinges" that the life of the diaphragm is greatly extended. Indeed in some cases failure occurs from mechanisms such as abrasion rather than crack formation.

EXAMPLES

EXAMPLE 1

A diaphragm was made of a facing (convex side) layer of expanded polytetrafluoroethylene that had been densified (obtained from W. L. Gore & Associates, Inc.) and an air-pressure side (concave side) layer of uncured Neoprene rubber.

The two layers were adhered using Chemlock 250 polyurethane adhesive by heating at a temperature below the cure temperature of the rubber. The densified PTFE had been pretreated with sodium ammoniate etchant. The resulting composite was placed in a circular diaphragm mold equipped to form 90 radial ribs on the PTFE face over the flexural portion. The mold was heated at 191° C. for 4 minutes at a pressure of 7580 MPa. The densified PTFE starting layer was 35 mils (84 micrometer) thick and the Neoprene was 90 mils (2.28 micrometer) thick. The Neoprene had a thin layer nylon fabric on it as a reinforcing layer. The diameter of the resulting diaphragm was about 8 inches (21 cm).

The diaphragm was placed in an air-operated diaphragm pump and run pumping water at 120 cycles per minute. The inlet air pressure was set at 110 psi and the water was constrained by valving to build up a 50 lb. back pressure. The diaphragm was operated for 19.5 million cycles and then removed and inspected. The diaphragm had formed two small creases each about one inch long at "hinge" sites. Neither crease had deepened to the point where rubber was exposed.

Comparison Example

Several sets of diaphragms identical to those in the above example except having a smooth PTFE face without radial ribs were tested under the same conditions as above and found to fail by forming deep radial creases that exposed the rubber backing. Failure took place between 12 and 15 million cycles in all cases.

EXAMPLE 2

Diaphragms like that produced in Example 1 but with a larger diameter of 11 inches (28 cm) were made, and the rubber was 153 mils thick. These diaphragms were placed in an air operated diaphragm pump and run pumping water at 120 cycles per minute. The inlet air pressure was set to 100 psi and the water was constrained by valving to build up a 40 lb. back pressure. The diaphragms were operated for 8.5 million cycles and were removed and inspected. The diaphragms had not formed any deep creases (but had abraded through the PTFE at several points where they were in contact with the metal drive piston).

Comparison Example

A set of diaphragms identical to those in example 2 above but having a smooth PTFE face were prepared and tested in exactly the same way. These diaphragms failed at less than four million cycles due to the formation of three deep creases exposing the rubber backing material.

We claim:

1. A pump diaphragm having a circularly-configured body having a convex face side and a concave air-pressure receiving side consisting of a composite in which the convex face side is mace of polytetrafluoroethylene and the concave air-pressure receiving side is made of a resilient elastomeric material;
- said body having a central opening for receiving a piston rod;
- said body having a generally annular flexure portion that flexes in operation;
- said body having on the face side a plurality of radially disposed uniformly spaced ribs extending radially outwardly across said flexure portion.

* * * * *